UNITED STATES PATENT OFFICE 1,990,811

COATING COMPOSITION

Erich K. Zimmerman, Passaic, N. J., assignor to L. E. Carpenter & Co., Inc., Newark, N. J., a corporation of New Jersey No Drawing. Application January 16, 1931, Serial No. 509,269

1 Claim. (Cl. 134—79)

This invention relates, generally, to compositions for coating or covering surfaces of objects; and the invention has reference, more particularly, to a novel non-inflammable and fireproof coating composition or film and to the process of making the same; the said coating composition having a pyroxylin base and being especially adapted for use in coating cloth or paper used in the artificial leather trade.

Pyroxylin coatings, as heretofore generally manufactured, are usually highly inflammable and when such coatings are applied to an object such as the paper or cloth base material used in the artificial leather trade, the resulting surface coating being highly inflammable is readily deteriorated in the presence of heat and ofttimes an otherwise fireproof or slow burning object or material is rendered inflammable by the use of such a coating thereon.

The principal object of the present invention is to provide a novel non-inflammable fireproof coating composition having pyroxylin as the basic ingredient thereof and a process for making the same, which composition may be readily applied to objects such as a fireproof cloth or paper base to produce a coated material which may be finished with a smooth surface or may be embossed in either a plain color or in multi-color combinations, thereby producing a fireproofed coated material having finishes resembling those of leather.

Another object of the present invention lies in the provision of a novel fireproof coating composition which may be readily and easily embossed and which will retain the embossed characters steadfastly and without any tendency to soften or lose the sharp definitions made by the embossing plate, said coating composition being adapted to be finished in any color combination desired.

Still another object of the present invention is to provide a fire resisting coating composition of the above character which is equally applicable to all types of surfaces whether fibrous, metal, wood and etc., and which composition is highly stable and wear resistant and possesses considerable flexibility, whereby the same is well adapted for use in the preparation of artificial leather goods and the like.

Other objects of this invention, not at this time more particularly enumerated, will be clearly understood from the following detailed description of the same.

In accordance with the principles of the present invention, the method of producing the novel fireproof coating composition consists in initially intermixing together a desired pigment in dry powder form, a suitable fireproofing compound such as boric acid in powder form, and tricresyl phosphate which, being a liquid, serves to form a paste when intermixed with the two former materials. This paste may be termed a pigment paste, which paste is adapted to be ground in a suitable grinder to a very fine condition adapted for use in forming a coating composition. This paste is then intermixed with other ingredients including a pyroxylin solution, boric acid and triphenyl phosphate to form the novel non-inflammable and fireproof composition of this invention.

As an example of the novel fireproof coating composition employing the principles of the present invention, the ingredients are mixed together in the following percentages by weight:—

| | Per cent |
|---|---|
| Pyroxylin solution (16% pyroxylin approx.) | 63 |
| Pigment | 5 |
| Boric acid | 21 |
| Tricresyl phosphate | 6 |
| Triphenyl phosphate | 5 |

The composition may be prepared for commercial use in the following manner.

A pigment paste is made by intermixing ten pounds of dry pigment, ten pounds of dry boric acid and twelve pounds of tricresyl phosphate. The resulting pigment paste is then ground into fine form in a suitable grinding mill and is thereby rendered suitable for use in preparing the coating composition. Eighty pounds of a pyroxylin solution consisting of approximately 16% by weight of pyroxylin dissolved in a suitable solvent or solvents such as alcohol, ethyl or other acetate, benzol or toluol, is intermixed with twenty pounds of dry boric acid and six pounds of triphenyl phosphate in solid form. The boric acid and triphenyl phosphate ingredients dissolve in the pyroxylin solution and to this resultant solution or mixture is added twenty pounds of the pigment paste as prepared above. The pigment paste is thoroughly stirred into the pyroxylin, boric acid and triphenyl mixture, thereby forming the novel composition of this invention.

If desired, the composition may be thinned with suitable thinners consisting of any of the above mentioned solvents for pyroxylin. The boric acid ingredient of the composition is thoroughly intermixed throughout the mass thereof and serves as a fireproofing agent. The tricresyl phosphate ingredient serves as a plasticizer and stabilizer, while also performing the function of a fire dampening agent. The triphenyl phosphate ingredient serves the function of a plasticizer and is particularly valuable in preventing the coating composition from becoming tacky when applied to a surface and causes the composition to readily take and permanently retain an impression such as that produced by an embossing plate. The triphenyl phosphate ingredient also serves as a fire dampening agent. The pigment ingredient gives the desired color or color combination to the fireproof composition.

It is not essential that boric acid be used as the fireproofing agent for another material or materials may be used in lieu of boric acid, if desired. For example, aluminum potassium sulphate may be used in place of boric acid. When using aluminum potassium sulphate, the ingredients of the compositions are intermixed together in the following percentages by weight:—

|  | Per cent |
|---|---|
| Pyroxylin solution (16% pyroxylin approx.) | 58 |
| Pigment | 6 |
| Aluminum potassium sulphate | 24 |
| Tricresyl phosphate | 7 |
| Triphenyl phosphate | 5 |

This composition may be prepared for commercial use in the following manner.

The pigment paste is prepared by intermixing ten pounds of pigment, ten pounds of aluminum potassium sulphate and twelve pounds tricresyl phosphate. This paste is ground to a fine condition in a grinding mill. A mixture of sixty-four pounds of pyroxylin solution is prepared to which is added twenty pounds of aluminum potassium sulphate, six pounds of triphenyl phosphate and a half of a pound of tricresyl phosphate (the tricresyl phosphate ingredient may be omitted from this mixture in some instances and still produce the desired composition). To this mixture of pyroxylin solution, aluminum potassium sulphate, triphenyl phosphate and tricresyl phosphate is added twenty pounds of the above pigment paste, which pigment paste is thoroughly intermixed with the other ingredients, thereby producing the novel fireproofing composition of this invention.

It is found in practice that the novel composition of this invention, produced by using either boric acid or aluminum potassium sulphate as the fireproofing agent, is thoroughly fireproof and is of great stability and when applied to a fireproof backing produces an article which is thoroughly fireproof. This composition may be given any color or color combination desired by use of suitable pigments and the same produces a film which when dried is very elastic, thereby enabling the same to be used to advantage on artificial leather goods. The novel composition is not tacky and receives and retains permanently an impression such as the impression simulating leather on an embossing plate.

While the relative proportions given above of the several ingredients forming the novel coating composition are illustrative of the invention, it is to be understood that variation of the proportions of these ingredients may be made within reasonable limits. In practice, it has been found, experimentally, that the percentage by weight of pyroxylin solution may vary from 40 to 70% while the relative proportions of the remaining ingredients remain the same. If the percentage of pyroxylin solution is decreased below 40%, the composition will be too heavy and will not flow readily owing to the excessive quantity of inert material such as boric acid present, whereas if the percentage of the pyroxylin solution is increased over 70%, the composition will lose its fireproofing qualities. Likewise, the percentage by weight of pigment may vary from 2½ to 10% with the relative proportions of the other ingredients remaining constant, the amount of pigment used depending upon the color desired or the relative strength of the pigment itself. The fireproofing ingredient whether boric acid or aluminum potassium sulphate may be varied from 10 to 30% of the total composition, assuming the relative proportions of the remaining constituents remain the same. If the fireproofing ingredient is decreased below 10%, the composition will lose its fireproofing qualities, whereas if this ingredient is increased above 30% of the total, the composition will not thin well nor will it flow properly. The tricresyl phosphate ingredient may be varied from 2½ to 10%, while the proportions of the other ingredients remain the same. Also, increasing the proportion of tricresyl phosphate, increases the flowability of the composition. The triphenyl phosphate may be varied from 2 to 8% of the total while the quantities of the other ingredients remain the same.

Changes in the quantities of two or more ingredients simultaneously within reasonable limits may also be made while still obtaining the purposes and functions of the composition within the scope and spirit of this invention.

What is claimed is:—

A non-inflammable fireproof flexible coating composition comprising a mixture of the herein named ingredients in the approximate percentages by weight as follows:—

|  | Per cent |
|---|---|
| Pyroxylin solution (16% pyroxylin approx.) | 58 |
| Pigment | 6 |
| Aluminum potassium sulphate | 24 |
| Tricresyl phosphate | 7 |
| Triphenyl phosphate | 5 |

ERICH K. ZIMMERMAN.